(12) United States Patent
Molander

(10) Patent No.: US 6,416,701 B1
(45) Date of Patent: Jul. 9, 2002

(54) METHOD OF FORMING A BOX BLANK

(75) Inventor: Dan Molander, Kristianstad (SE)

(73) Assignee: Recopac AB, Eslow (SE)

( * ) Notice: Subject to any disclaimer, the term of this patent is extended or adjusted under 35 U.S.C. 154(b) by 0 days.

(21) Appl. No.: 09/403,580

(22) PCT Filed: Sep. 2, 1997

(86) PCT No.: PCT/SG97/00039

§ 371 (c)(1),
(2), (4) Date: Oct. 22, 1999

(87) PCT Pub. No.: WO98/47775

PCT Pub. Date: Oct. 29, 1998

(30) Foreign Application Priority Data

Apr. 24, 1997 (SE) .................................... 9701293

(51) Int. Cl.[7] .............................................. B29C 45/14
(52) U.S. Cl. ...................... 264/250; 264/267; 264/274; 264/275
(58) Field of Search ................................. 264/250, 274, 264/275, 279, 267

(56) References Cited

U.S. PATENT DOCUMENTS

| 4,757,909 A | 7/1988 | Matsuura ........................ 220/7 |
| 4,879,084 A | * 11/1989 | Parnigoni .................... 264/295 |
| 5,501,758 A | 3/1996 | Nitardy ........................ 156/198 |

FOREIGN PATENT DOCUMENTS

| EP | 0073357 | 3/1983 |
| FR | 2631314 | 11/1989 |
| WO | WO87/02966 | 11/1986 |
| WO | WO94/02364 | 7/1993 |
| WO | WO97/45326 | 12/1997 |

* cited by examiner

Primary Examiner—Jan H. Silbaugh
Assistant Examiner—Edmund H. Lee
(74) Attorney, Agent, or Firm—Foley & Lardner (57) ABSTRACT

A method of forming a stackable plastic box blank is described. A net of hinged elements are formed from a first plastic material. A plurality of panels are formed from a second plastic material, with the panels located between the individual elements of the net. The individual panels are then bonded or fused to the hinge elements.

9 Claims, 9 Drawing Sheets

METHOD OF FORMING A BOX BLANK

FIELD OF THE INVENTION

The present invention relates to a box blank and a method of forming same.

DESCRIPTION OF RELATED ART

Containers, such as boxes, are ubiquitous and essential for storage, packaging and transport of various goods and products. Cardboard boxes are generally preferred over boxes made of other materials such as plastic and various blanks for transport of cargo because they are lighter, less bulky and recyclable. Such boxes may also be formed as a blank, to minimize volume when empty and which is assemblable to form the box. However, the inherent disadvantages of cardboard boxes are that they are prone to damage and have weak hinges and are thereby unsuitable for stacking and containing heavy loads. Moreover, cardboard boxes normally require adhesive taping of the flaps covering the top of the box to prevent therm from caving in or opening up.

SUMMARY OF THE INVENTION

It is an object of the invention to provide an improved box blank.

According to the invention in the first aspect there is provided a box blank formed from plastics material and comprising a plurality of hinge elements connecting a plurality of panels for forming sides of the box, the hinge elements and panels being formed from different plastics material.

The hinge elements are preferably formed by plastics material having greater toughness but less rigidity than the plastics material forming the panels to provide structure advantages for both components which could not be achieved with a box blank of a single material.

The hinge elements are further preferably formed from a plastics material having a melt index less than the material from which the panels are formed and have a plurality of projections formed thereon.

According to the invention in the second aspect there is provided a method of forming a box blank comprising the steps of: forming a net of hinge elements of a first plastics material; and forming panels of a second plastics material in the spaces between elements of the net.

Preferably the net is placed in an injection mould with the second plastics material being injected into said spaces to form the panels. Preferably the injection moulding process is separately controlled for each panel so that the panels are formed evenly.

The net is preferably formed from the first plastics material having a melt index less than the melt index of the second plastics material so that the second plastics material when injected melts the skin of the first plastics material so that the plastics material fuse together to form the box blank.

Preferably the net is provided with a plurality of projections formed thereon which act, firstly, to help reduce surface tension effects when the second material is injected and, form islands to which the second material can attach itself. Furthermore, the projections project slightly above the level of the panels once formed and when formed from a less rigid material, create an anti-slide panel to assist in frictional contact between the boxes when stacked.

According to the invention in the third aspect there is provided a box blank comprising a plurality of panels connected by hinge elements, the panels including structural panels forming the sides of the box and load bearing panels, the load bearing panels being connected to the structural panels by hinge elements formed parallel to the intended direction of load bearing support provided by the load bearing panels.

With the box blank constructed in accordance with the third, aspect of the invention, the load bearing panels provided additional columnal support to the structural panels without an intervening hinge element in the direction of intended, load support which might be subject to stress leading to consequent failure.

BRIEF DESCRPTION OF THE DRAWINGS

An embodiment of the invention will now be described, by way of example, with reference to the accompanying drawings in which.

DETAILED DESCRIPTION OF THE INVENTION

Figure 1:
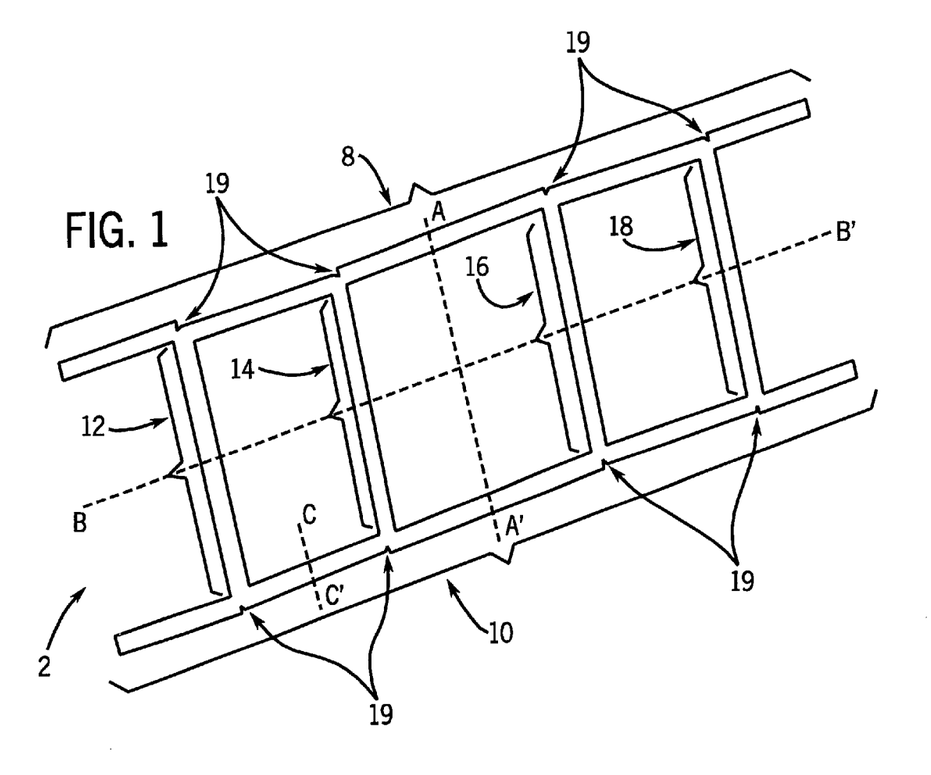
FIG. 1 is a perspective view of a net used for reinforcing hinge regions of a box blank being an embodiment of the invention.

With reference to FIG. 1 an injection—moulded net 2 formed as a single piece of material, preferably made of rubber-modified polypropylene is shown. The quantity of elastomer in the rubber-modified polypropylene is preferably such as not to cause problems if the blank is regranulated in one piece. Net 2 is used for the purpose of forming the hinges of a box blank. A first injection mould is used to manufacture net 2. Pressures and temperatures involved in the injection moulding process follow known techniques.

Net 2 is symmetrical along axes A–A' and B–B', and has a ladder-like appearance. It comprises two elongate rectangular strips 8 and 10 of equal length placed parallel to each other and joined together by four shorter rectangular strips 12, 14, 16 and 18 parallel to each other, perpendicular to strips 8 and 10 and separated from each other by a predetermined spacing. The spacing between the shorter strips is dependent on the dimensions of the box required. The elongate edges of strips 12, 14, 16 and 18 are formed of unequal dimensions and strips 8 and 10 bear discontinuities 19 along their outer edges to enable strips 12, 14, 16 and 18 to be easily folded along their lengths. Net 2 is preferably of a constant thickness.

Figure 2:
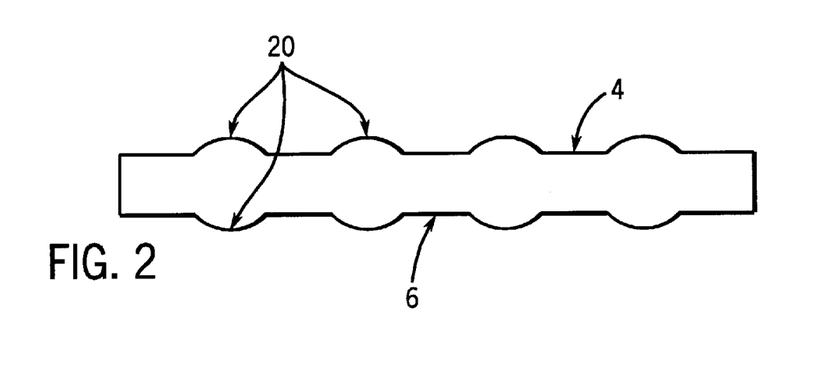
FIG. 2 is a cross-sectional view taken along line C–C' in FIG. 1.

FIG. 2 depicts an exploded view of the cross-section C–C' and shows panels 4 and 6 of net 2 bearing equally spaced convex projections 20 arranged in four rows along the width of strips 8, 10, 12 14, 16 and 18.

Figure 3:
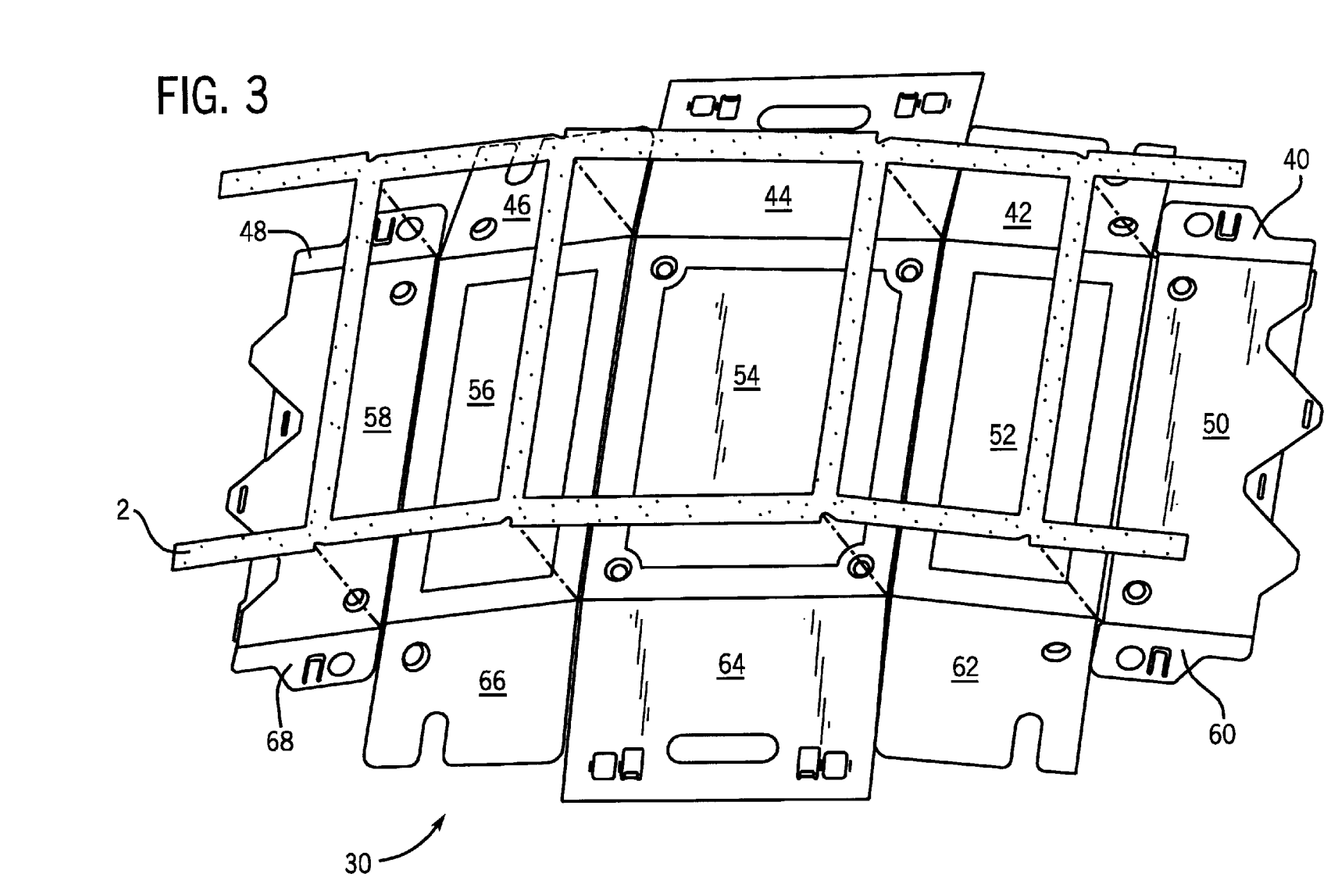
FIG. 3 is a perspective view of a box blank showing use of the net.
Figure 4A:
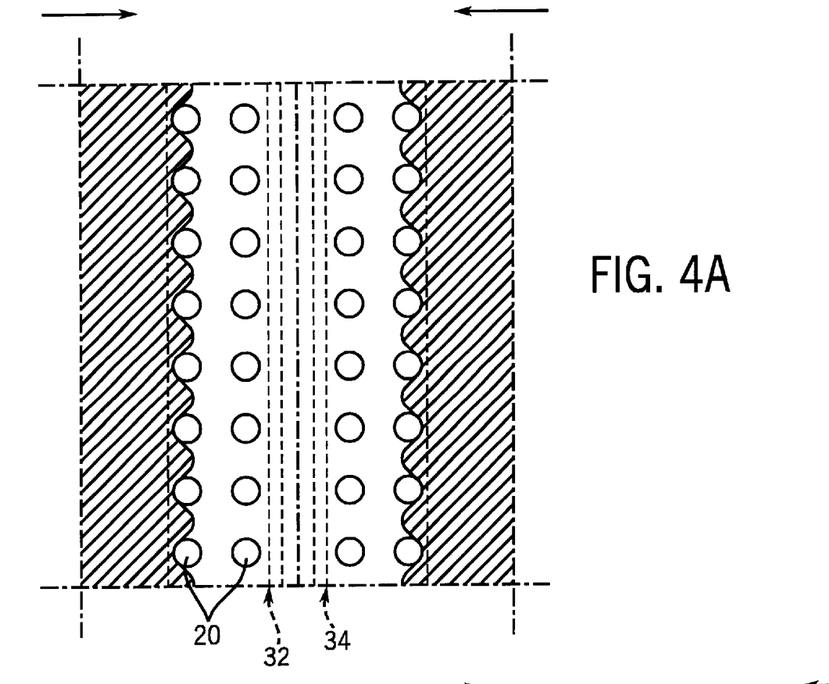
FIGS. 4A, 4B and 4C depict progressively the flow of molten plastics along the net shown in FIG. 1 resulting in the formation of a hinge element to be used in the blank as shown in FIG. 3.
Figure 4B:
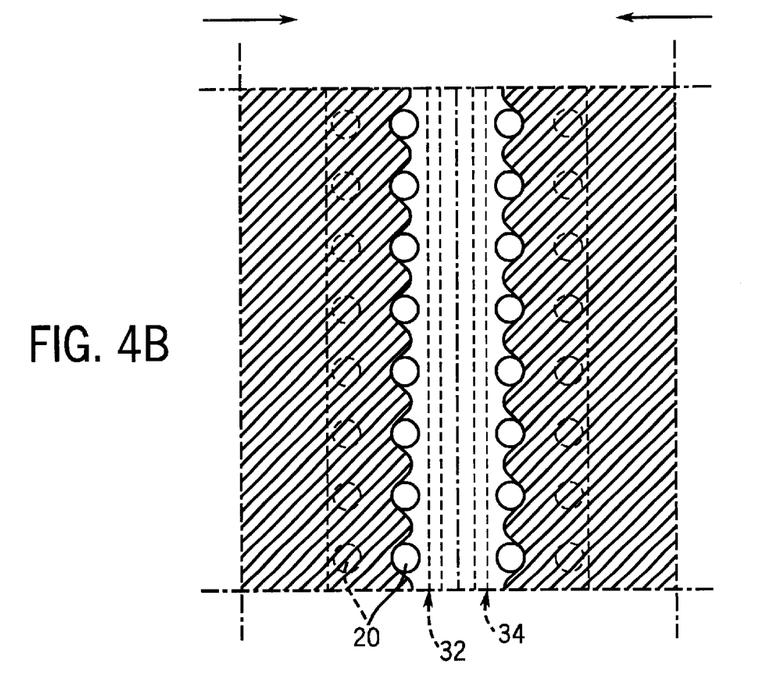
Figure 4C:
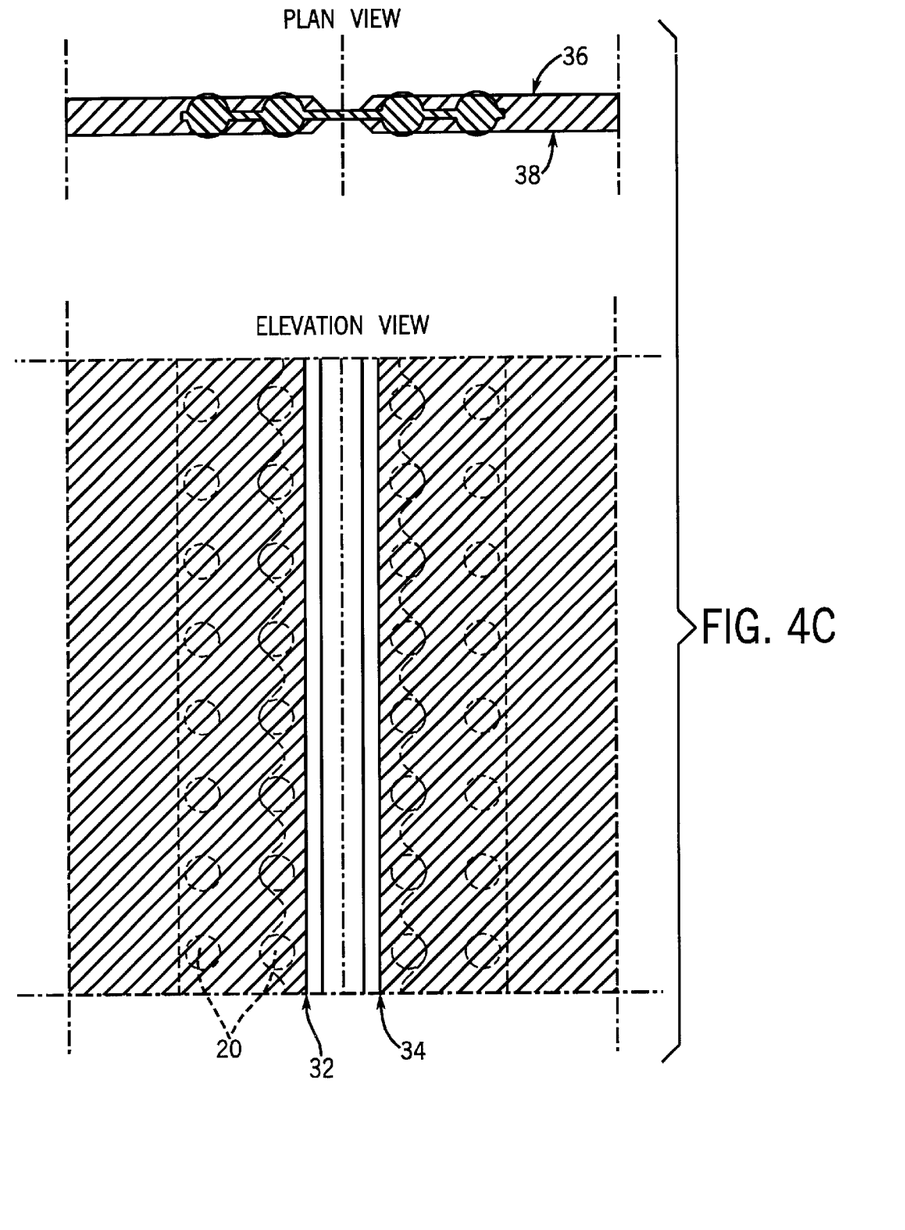

To form the blank, net 2 is placed in a second injection mould (not shown) having a shape to produce box blank 35 as shown in FIG. 3. Once net 2 is placed in the mould, molten plastics, preferably a copolymer polypropylene with a melt index between 15–20 and marginally higher than the rubber-modified polypropylene used for net 2, is then injected to fill in the mould. Multiple injection points are used for injection of the molten copolymer polypropylene in the spaces in between net 2 to ensure a controlled and even flow of the molten copolymer polypropylene, with the injection being separately controlled at each injections point to fill the spaces simultaneously. The molten copolymer polypropylene follows a laminar flow, originating from injection points in the spaces in between the elements of net 2 and moves outwards from the injection points towards the edges of net 2. Thereafter and as shown in FIGS. 4A, 4B and 4C, the molten polypropylene flows over the net 2 but only as far as an edge of the mould between 32, 34. Since the rubber-modified polypropylene of net 2 has a marginally lower melt index, it melts partially on contact with the molten copolymer polypropylene, such that both materials fuse to form a blank, at the same time preserving the structure of net 2. The flow of the molten copolymer polypropylene is stopped by the mould once it reaches lines 32 and 34 along each of the strips 8, 10, 12, 14, 16 and 18; as shown in FIG. 4C.

The convex projections 20 of net 2 aid in laminar flow of the molten copolymer polypropylene by breaking up its panel tension and increase the grip of net 2 on the copolymer polypropylene and ensure the strength of blank 35. The convex projections 20 also marginally protrude from panels 36 and 38 of blank 35 as shown in the plan view of FIG. 4C.

Figure 5A:
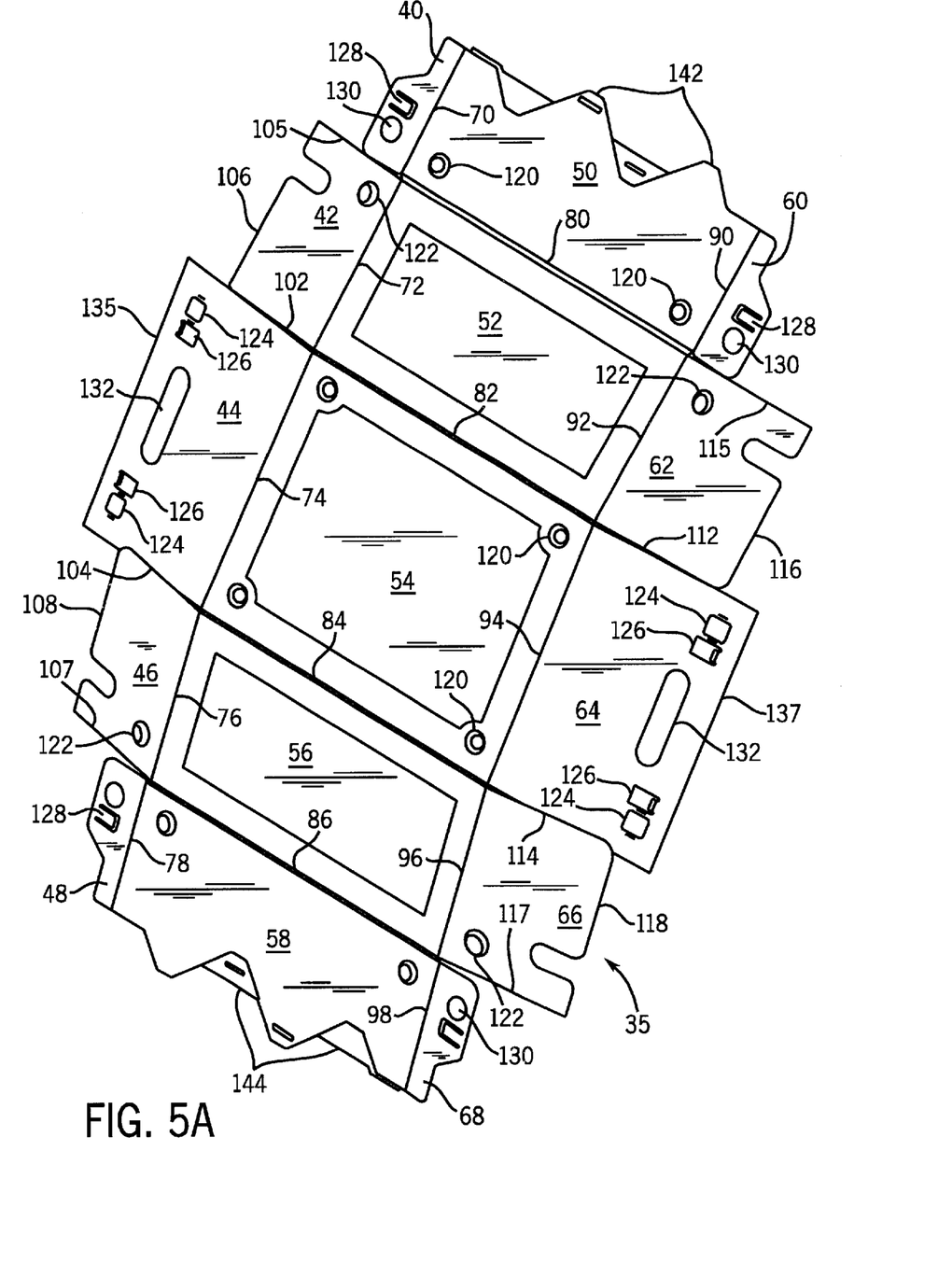
FIG. 5A depicts in more detail the blank of FIG. 3.
Figure 5B:
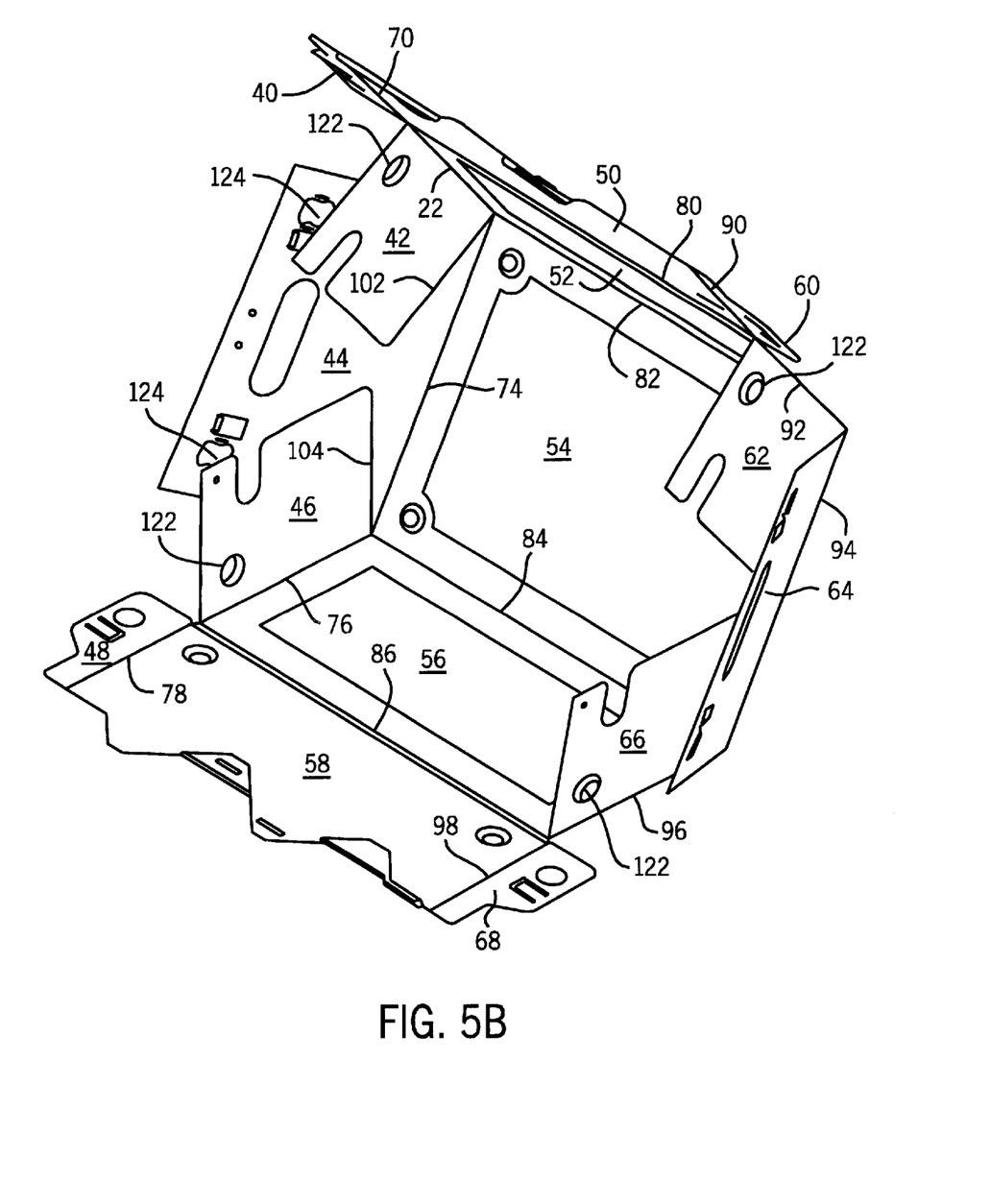
FIGS. 5B, 5C, 5D and 5E depict progressively how the blank may be folded to form a box.
Figure 5C:
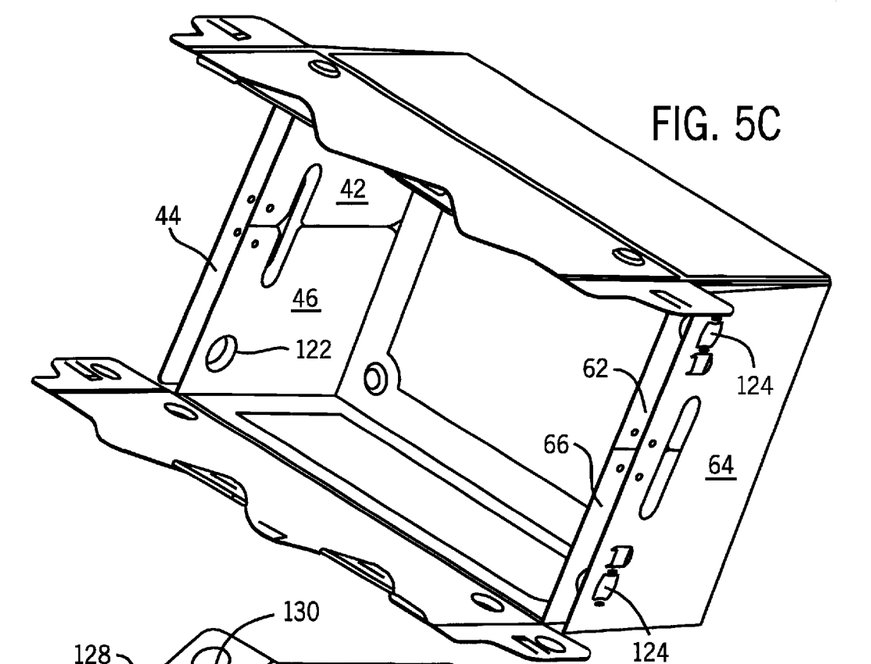

Blank 35, as depicted by FIG. 5A, therefore has hinge elements 70, 72, 74, 76, 78, 80, 82, 84, 86, 90, 92, 94, 96 and 98 which are formed by the unfilled spaces between the lines 32 and 34, of FIG. 4B, along the strips of net 2, the hinge elements connecting the thus formed panels 40, 42, 44, 46, 48, 50, 52, 54, 56, 58, 60, 62, 64, 66 and 68. The panels comprise structural panels 40, 44, 48, 50, 52, 54, 56, 58, 60, 64, 66 and 68 joining the sides and closure of the box and load bearing panels 42, 46, 62 and 66, the use of which is detailed hereinafter with reference to FIG. 6.

As depicted by FIG. 5A, panel 54 is moulded such that it contains one concavity 120 near each of its four corners. The concavities 120 are formed such that they appear as convex projections on the reverse side of panel 54. Panels 50 and 58 also contain similar concavities 120 near hinge elements 80 and 86 respectively. Panel 42 contains a concavity 122, formed near the corner formed by edge 105 and hinge element 72, with diametrically opposite ends cut away. Concavity 122 appears as a convex projection on the reverse side of panel 42. Panels 46, 62 and 66 contain similar concavities 122 near the corners formed by edge 107 and hinge element 76, edge 115 and hinge element 92 and edge 117 and hinge element 96 respectively. Panels 44 and 64 contain rectangular openings 124 at either end of edges 135 and 137 respectively. Openings 124 are formed such that the convex projections of concavities 122 snap fit into them. Panels 44 and 64 contain further U-shaped openings 126 located adjacent to their rectangular openings 124. Panels 44 and 64 also contain rectangular openings 132 with rounded corners and lengths running parallel to hinge elements 74 and 94. Panels 40, 48, 60 and 68 each contain one U-shaped slit and a circular indentation 130. The U-shaped slits are formed such that they result in U-shaped sections 128 that snap fit into U-shaped openings 126. Circular indentations 130 are formed such that convex projections of concavities 122 snap fit into them. Panels 50 and 58 each possess two V-shaped projections 142 and two V-shaped receptacles 144.

FIGS. 5A, 5B, 5C, 5D and 5E progressively illustrate how the blank 35 may be folded in a particular manner to form the box. Panels 44 and 64 are folded towards each other through an angle of ninety degrees along hinge elements 74 and 94 respectively. Panels 42 and 62 are also folded towards each other through an angle of ninety degrees along hinge elements 72 and 92 respectively. Similarly panels 46 and 66 are also folded towards each other through an angle of ninety degrees along hinge elements 76 and 96 respectively. At this stage blank 35 should resemble FIG. 5B. Panels 52 and 56 are then folded towards each other angle through an angle of ninety degrees along hinge elements 82 and 84 respectively. Edges 102 and 104 of panels 42 and 46 respectively will then be aligned with hinge element 74 such that edges 106 and 108 meet. Similarly edges 112 and 114 of panels 62 and 66 respectively will be aligned with hinge element 94 such that edges 116 and 118 meet. Blank 35 would then resemble FIG. 5C. The convex projections of concavities 122 present on panels 42 and 46 are then snap fit into rectangular openings 124 on panel 44 thereby holding panels 42, 44 and 46 together. Similarly the convex projections of concavities 122 present on panels 62 and 66 are snap fit into rectangular openings 124 on panel 64 thereby holding panels 62, 64 and 66 together. Convex projections of concavities 122 further protrude out of rectangular openings 124 after snapping into them.

Figure 5D:
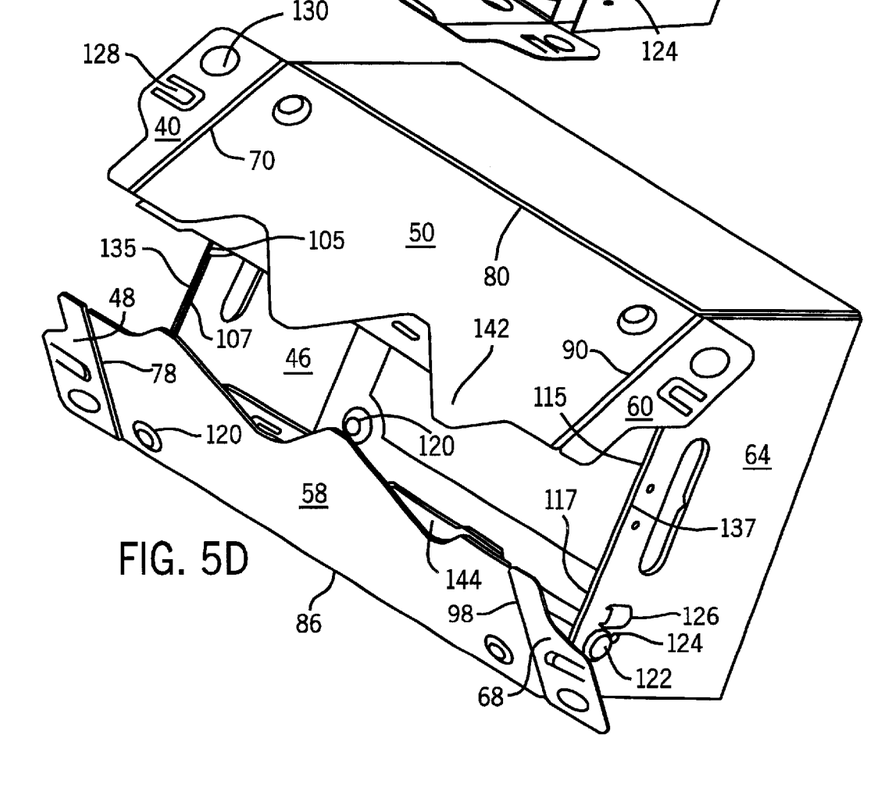
Figure 5E:
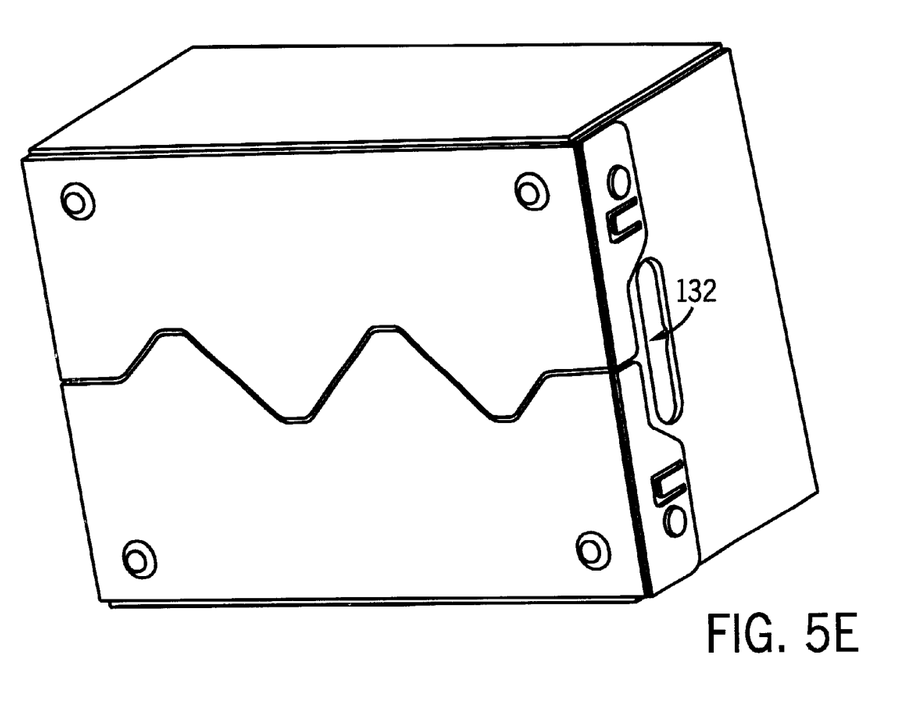

FIG. 5D shows how panel 50 is then folded through an angle of ninety degrees along hinge element 80 such that hinge element 70 is aligned along edge 105 of panel 42 and a portion of edge 135 of panel 44 and hinge element 90 is aligned along edge 115 of panel 62 and a portion of edge 137 of panel 64. Similarly panel 58 is folded through an angle of 90 degrees along hinge element 86 such that hinge element 78 is aligned along edge 107 of panel 46 and a portion of edge 135 of panel 44 and hinge element 98 is aligned along edge 117 of panel 66 and a portion of edge 137 of panel 64. The V-shaped projections 142 of panel 50 then fit into the corresponding V-shaped receptacles of flap 58 and vice-versa. Panels 40 and 48 are then folded through an angle of ninety degrees along hinge elements 70 and 78 such that their respective U-shaped sections 128 snap fit into the U-shaped openings of panel 44 at the same time allowing the convex projections of concavities 122 protruding out of panel 44 to snap fit into circular indentations 130. Thus, panels 40, 42, 44, 46 and 48 are held together. Panels 60 and 68 are similarly folded through an angle of ninety degrees along hinge elements 90 and 98 and snap fit so that panels 60, 62, 64 and 68 are held together. A box is thus formed and is depicted in FIG. 5E. Rectangular openings 132 with rounded corners may be used to grip and carry the box.

Figure 6:
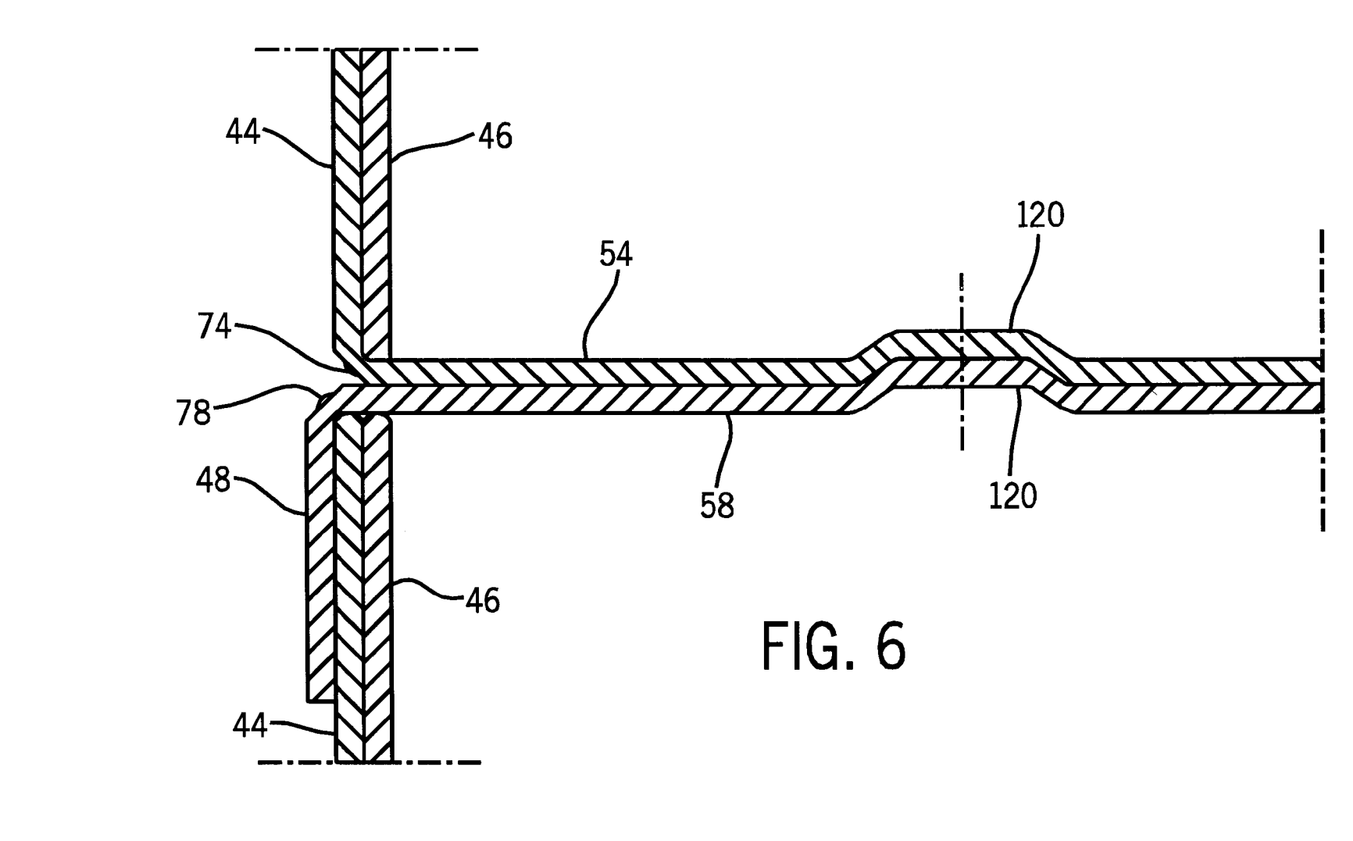
FIG. 6 is a sectional view of part of two such boxes stacked on top of each other.

FIG. 6 illustrates two such boxes stacked on top of each other. The convex projections of concavities 120 on panels 50 and 58 of the lower box rest in concavities 120 of panel 54. The two boxes are thus held in place and the upper box is prevented from sliding over the lower box. Moreover, the force exerted by the upper box on the lower box due to its weight is borne principally by load bearing panels, 46 (and like panels 42, 62 and 66) thereby reducing the pressure that would otherwise exist on the panels 44 and 64 (and like panels) and the hinges formed by the hinge elements 70, 78, 74, 90, 98 and 94. The boxes are further prevented from sliding over each other by the additional friction created by the marginally protruding sections of convex projections 20 of net 2.

When the boxes are in a collapsed state such as in FIG. 5A, they may be stacked on top of each other such that convex projections of concavities 120 on the panel of the lower box rest in the concavities 120 of the upper box thereby preventing the boxes from sliding over each other.

The embodiment of the invention described herein above is not to be construed as limitative. For example, although the box is described incorporating the reinforcing net, and a novel load-resistant structure, these features may be used independently. Furthermore, both the box and the reinforcing net may be constructed of materials other than polypropylene such as polythene. As such it is to be understood that modifications may be made to the embodiments described without departing from the scope of the invention.

What is claimed is:

1. A method of forming a box blank comprising the steps of:

forming a net of hinge elements of a first plastics material;

forming a plurality of panels of a second plastics material in the spaces between the surrounding hinge elements of the net, each of the plurality of panels being formed partially over the surrounding hinge elements of the net; and bonding each of the formed plurality of panels to the surrounding hinge elements of the net.

2. A method as claimed in claim 1 wherein the net is formed by injection moulding.

3. A method as claimed in claim 1 wherein the panels are formed by injection moulding.

4. A method as claimed in claim 2 wherein the net of hinge elements and the panels are formed from separate injection moulding processes.

5. A method as claimed in claim 3 wherein the injection moulding of the second plastics material to form the panels is separately controlled for each panel.

6. A method as claimed in claim 1 wherein the panels and hinge elements are bonded together via melting.

7. A method as claimed in claim 1 wherein the first plastics material has a lower melt index than the second plastics material.

8. A method as claimed in claim 1 wherein the net is formed with a plurality of projections.

9. A method as claimed in claim 1 wherein the first plastics material is rubber-modified polypropylene and the second plastics material is polypropylene.

\* \* \* \* \*